(No Model.)
J. F. STILLMAN.
Conveying Distributer.
No. 236,192.  Patented Jan. 4, 1881.
2 Sheets—Sheet 1.
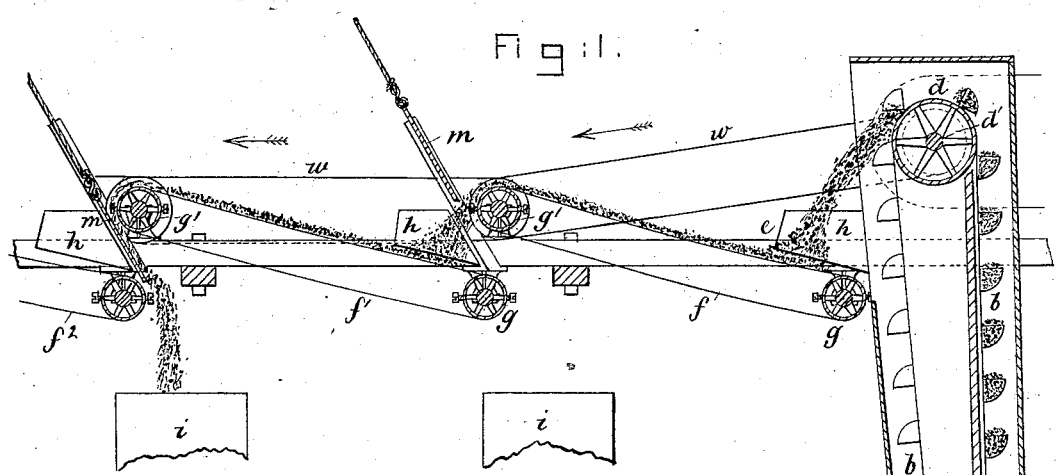
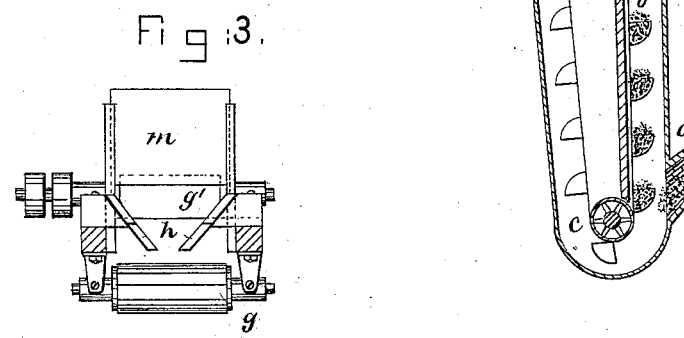
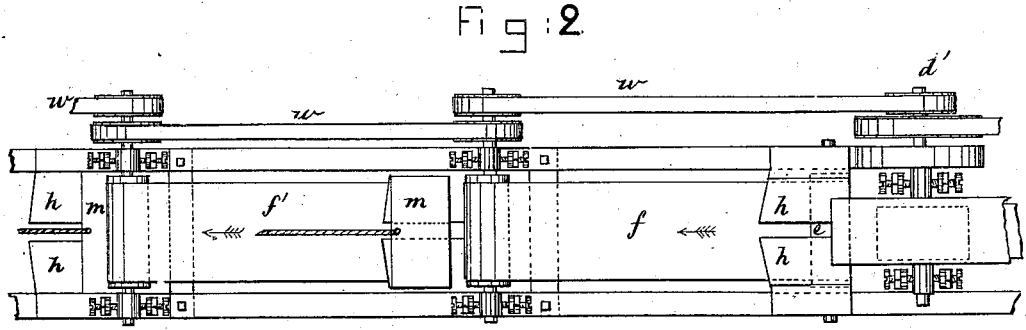
Witnesses
L. F. Connor
D. F. Cowe
Inventor
Joseph F. Stillman
by Crosby Gregory
Attys.

(No Model.)

2 Sheets—Sheet 2.

J. F. STILLMAN.
Conveying Distributer.

No. 236,192.    Patented Jan. 4, 1881.

WITNESSES
L. F. Connor
D. F. Cowl

INVENTOR
Joseph F. Stillman
by Crosby & Gregory
Attys.

UNITED STATES PATENT OFFICE.

JOSEPH F. STILLMAN, OF BROOKLINE, MASSACHUSETTS.

CONVEYING-DISTRIBUTER.

SPECIFICATION forming part of Letters Patent No. 236,192, dated January 4, 1881.

Application filed November 8, 1880. (No model.)

*To all whom it may concern:*

Be it known that I, JOSEPH F. STILLMAN, of Brookline, county of Norfolk, and State of Massachusetts, have invented a new and useful Improvement in Conveying-Distributers for Granular or Pulverized Material, of which the following description, in connection with the accompanying drawings, is a specification.

My invention relates to a distributer for granular and pulverized material—as grain, bone-black, or any other similar material that it is desired to have delivered at different points from time to time.

The invention is embodied in an apparatus containing a series of endless belts so arranged that the material to be distributed is delivered upon the traveling surface of one of the said belts, and after it has passed over the pulley which supports the end of the belt toward which the said upper surface is traveling falls upon the end of the next belt, placed beneath the end of the belt from which the material falls. The second belt will deliver the material upon the third, and this upon a fourth, and so on for as many as may be placed in a given series. The different receptacles or bins in which it is desired to distribute the material are provided with hoppers placed beneath the points at which one belt delivers upon another, and by interposing a suitable deflecting-gate in the path of the material as it passes from one belt to the other the material may be deflected by the said gate from the second belt into the receptacle underneath, so that the material may be delivered into any desired one of the receptacles by placing such gate or deflector between the belts at this point.

Instead of using a deflector interposed between the belts, the direction of the movement of the second belt may be reversed, so that it will deliver the material at the same end that it receives it directly into the receptacle, instead of carrying it to its other end and delivering there upon another belt or into a receptacle.

Figure 6:
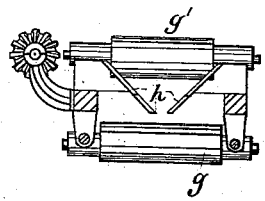

Figure 1 is a sectional elevation of a distributer embodying my invention; Fig. 2, a plan view thereof; Fig. 3, a sectional view at a point where one belt delivers upon another, and Figs. 4, 5, and 6 similar views of a modified form, in which the delivery into the bin is effected by reversing the movement of one of the belts.

The material, which may be any granular or pulverized material, is shown as received at $a$ in an endless series of buckets, $b$, carried in any usual manner over pulleys $c\ d$, by which the material is elevated and delivered at $e$ upon the first broad distributing-belt, $f$, running on pulleys $g\ g'$ in the direction indicated by the arrow, carrying the material from the pulley $g$ toward the pulley $g'$, over which it is delivered upon a second belt, $f'$, by which it may be carried to a third belt, $f^2$, and so on for as many as may be placed in a series, the pulley $g$ and the receiving ends of each belt being placed beneath the pulley $g'$ of the delivery end of the preceding belt of the series, so that the grain, when passing from one belt to the other, falls through the space between the pulleys $g'$ and $g$. The endless belts are all driven at a uniform speed by a series of driving-belts, $w$, driven from the shaft $d'$ of the pulley $d$, carrying the endless series of buckets $b$.

Guide-boards $h$ are used at each point where the material is delivered upon a new belt, the said boards being inclined, as shown in Fig. 3, to confine the material in position to the middle portion of the belt $f$.

Receptacles $i$, or suitable hoppers leading to proper receptacles, are placed beneath each of the points where one of the belts, $f$, delivers upon another, and in one embodiment of my invention I cause the material to be delivered in the desired one of the said receptacles, as the left-hand one in Fig. 1, by interposing a deflecting-gate, $m$, running in suitable guides $m'$, in the path of the material from the delivering end of the belt $f'$ to what would be the receiving end of the belt $f^2$ at this point, where the said gate is interposed. The said gate is arranged to serve as a guide to direct the grain into the receptacle $i$ beneath it, as well as to prevent it from being delivered upon the next endless belt, $f^2$.

Figure 4:
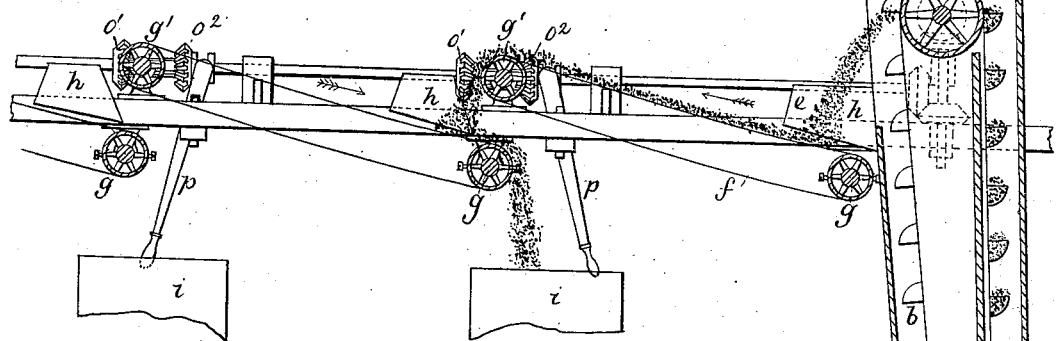
Figure 5:
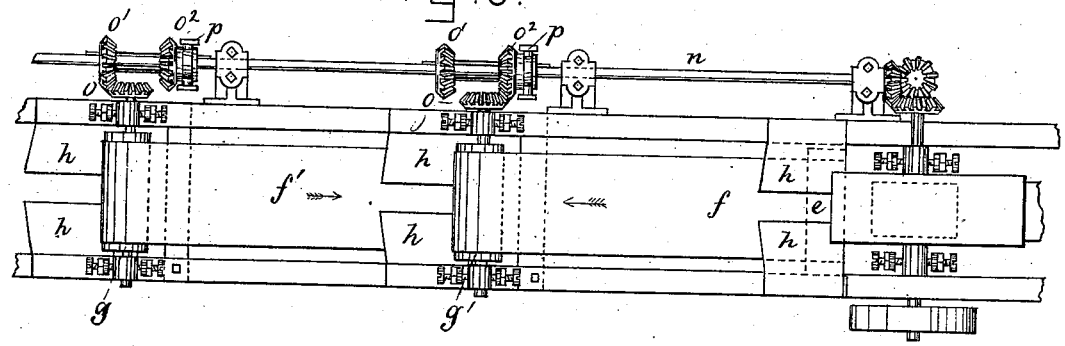

In the modification shown in Figs. 3, 4, and 5 the driving-shaft $n$, by which the endless pulleys are all operated, is provided with a series of reversing-gears, $o$, of usual construction, consisting of two bevel-gears, $o'\ o^2$, keyed to shaft $n$ so as to rotate therewith, but to have a free longitudinal movement thereon, which may be imparted to them by handled levers $p$, to cause one or the other of the said pinions $o'$ $o^2$ to engage the pinions $g^3$ on the shaft carrying the pulleys $g'$ of the endless belts, and drive the said belts in either direction, as desired, so that by operating the said reversing-gears to reverse the direction of movement of one of the endless belts the said belt may deliver over the lower pulley, $g$, at the end at which it receives, instead of carrying the material to the other end and delivering it over the pulley $g'$ in the usual manner.

In Fig. 4 the direction of the movement of the belt $f'$ is reversed, so that it delivers the grain over the pulley $g$ at the same end at which it receives it, into the receptacle $i$ placed beneath.

The different endless belts $f f' f^2$, &c., are shown in the drawings as extended in a direct line from one another; but it is obvious that the direction of any one of the belts may be changed, the guide-board $h$ being also properly changed, without departing from my invention, so that the material may be carried over a considerable area and delivered at any point thereof, as desired.

I claim—

1. In an apparatus for conveying and distributing granular or pulverized material, a series of endless belts arranged each to receive the material upon it at one end and to carry it to and deliver it from the other end upon the receiving end of the next belt of the series, combined with means to throw any one of the said belts out of operation for conveying the material along it, thereby to cause the material delivered from the preceding belt to be received in a receptacle, instead of being conveyed farther, substantially as described.

2. In an apparatus for distributing granular or pulverized material, a series of endless belts each arranged to receive the material at one end and carry it to the other end and deliver it there upon the next belt of the series, combined with means to cut off the delivery from one belt to the next, and cause the material to be delivered instead into a suitable receiver placed beneath the delivery-point of any desired one of the belts, substantially as described.

3. In an apparatus for conveying and distributing granular or pulverized material, a series of endless belts each having the pulley at its delivery end above the pulley at the receiving end of the next belt of the series, combined with gates to be interposed between the said pulleys at the delivery end of any one belt and the receiving end of the next belt of the series, to cut off the delivery of material from the first to the second of said belts and direct it into a suitable receiver placed at that point, substantially as described.

In testimony whereof I have signed my name to this specification in the presence of two subscribing witnesses.

JOSEPH F. STILLMAN.

Witnesses:
   JOS. P. LIVERMORE,
   ARTHUR REYNOLDS.